United States Patent
Caveny et al.

[11] Patent Number: 6,115,672
[45] Date of Patent: *Sep. 5, 2000

[54] METHOD FOR MEASURING AND QUANTIFYING AMOUNTS OF CARBON FROM CERTAIN GREENHOUSE GASES SEQUESTERED IN AND BY GRASSY AND HERBACEOUS PLANTS ABOVE AND BELOW THE SOIL SURFACE

[75] Inventors: John D. Caveny, Monticello, Ill.; William K. Crispin, Key Largo, Fla.; Robert L. Conley, Lexington, Ky.

[73] Assignee: Environmentally Correct Concepts, Inc., Monticello, Ill.

[*] Notice: This patent is subject to a terminal disclaimer.

[21] Appl. No.: 09/430,941

[22] Filed: Nov. 1, 1999

Related U.S. Application Data

[63] Continuation of application No. 09/109,635, Jul. 2, 1998, Pat. No. 5,975,020, and a continuation-in-part of application No. 08/956,216, Oct. 22, 1997, Pat. No. 5,887,547.

[60] Provisional application No. 60/051,701, Jul. 3, 1997, and provisional application No. 60/051,650, Jul. 3, 1997.

[51] Int. Cl.[7] .................................................. A01K 29/00

[52] U.S. Cl. ................................ 702/19; 119/174; 47/58.1
[58] Field of Search .............................. 119/174; 47/58.1; 702/19, 23, 24

[56] References Cited

U.S. PATENT DOCUMENTS

| | | |
|---|---|---|
| 5,036,618 | 8/1991 | Mori . |
| 5,339,254 | 8/1994 | Matlock et al. .......................... 702/19 |
| 5,471,785 | 12/1995 | Matthews ................................ 47/58.1 |
| 5,474,085 | 12/1995 | Hurnik et al. . |
| 5,482,008 | 1/1996 | Stafford et al. . |
| 5,697,326 | 12/1997 | Mottram et al. ........................ 119/174 |
| 5,887,547 | 3/1999 | Caveny et al. ........................... 119/174 |
| 5,975,020 | 11/1999 | Caveny et al. ........................... 119/174 |

*Primary Examiner*—Marc S. Hoff
*Assistant Examiner*—Bryan Bui
*Attorney, Agent, or Firm*—Banner & Witcoff, Ltd.

[57] ABSTRACT

Carbon sequestration of greenhouse gases ($CO_2$ and $CH_4$) is effected through enhancement of plant growth using defoliation techniques with and without grazing animals. Processes and devices for measurement of the verifiable quantity of carbon sequestered are disclosed.

6 Claims, 5 Drawing Sheets

A 365-DAY FORAGE SEEDING CALENDAR

METHOD FOR MEASURING AND QUANTIFYING AMOUNTS OF CARBON FROM CERTAIN GREENHOUSE GASES SEQUESTERED IN AND BY GRASSY AND HERBACEOUS PLANTS ABOVE AND BELOW THE SOIL SURFACE

CROSS REFERENCE TO RELATED APPLICATIONS

This is a continuation application based on Ser. No. 09/109,635, filed Jul. 2, 1998, issuing on Nov. 2, 1999, as U.S. Pat. No. 5,975,020, which is an application under 35 USC Section 119(e) based upon previously filed provisional applications, Ser. No. 60/051,701 filed Jul. 3, 1997 and Ser. No. 60/051,650 filed Jul. 3, 1997, both of which are incorporated herewith by reference, both of which are co-pending, and both of which are believed to disclose adequately and sufficiently subject matter claimed herein, and is a continuation in part of application Ser. No. 08/956,216 filed Oct. 22, 1997, which issued as U.S. Pat. No. 5,887,547 on Mar. 30, 1999.

BACKGROUND OF THE INVENTION

This invention relates to apparatus and methods for quantifying gases generated or sequestered by plant life and photosynthetic organisms and to means for assuring that said plant life is an accurate and reliable bio-indicator and a means to measure carbon sequestration in sinks of grassy and herbaceous organs and in the soil that supports them.

Gases, such as carbon dioxide and methane, found in trace quantities in the atmosphere, absorb infrared energy and prevent such energy from leaving the atmosphere. Such gases are often referred to as "greenhouse" gases. Increasing levels of greenhouse gases in the atmosphere may therefore contribute to an increase in average global temperatures, resulting in adverse climate changes otherwise known as global warming. During the last century, human activities, such as burning fossil fuels, have increased the atmospheric levels of these so-called greenhouse gases.

Since 1800, atmospheric concentrations of $CO_2$ have increased by more than 25%, primarily from the combustion of fossil fuels. For example, the burning of coal, oil and other organic-based fuels accounts for 99% of total $CO_2$ emissions in the United States. In 1994, 1,529 million tons of carbon equivalent (MTCE) of $CO_2$ were emitted as a direct result of fossil and organic-based fuel combustion. The other 1% of $CO_2$ emissions is a by-product of non-energy related industrial practices. These include cement and lime production, limestone consumption, and soda ash production and use.

Over the last two centuries, the concentration of atmospheric methane has more than doubled. Although methane is second in quantity to $CO_2$ as a greenhouse gas, methane is 24.5 times more effective in trapping heat or energy over a 100 year period. In 1994, 205 MTCE of methane were emitted in the United States. The largest sources are municipal solid waste landfills, which account for 90–95% of total landfill emissions. Currently, about 15% of landfill methane is recovered for use as an energy source. Roughly one-third of 1994 methane emissions came from agricultural operations. Topping the list of sources are enteric fermentation in domestic livestock and manure management. Approximately 27% of the 1994 United States methane emissions came from coal mining and petrol resources.

To solve the problem, at least two courses of action may be implemented: 1) reduce the rate at which greenhouse gases are discharged into the atmosphere; and 2) increase the rate these gases are cleansed from the atmosphere. Consequently, in response to concern regarding greenhouse gases and, pursuant to commitments made under the Framework Convention on Climate Change, the United States has undertaken efforts to reduce its greenhouse gas emissions. Rather than implementing a regulatory program, the Congress and President have called for voluntary action to reduce carbon emissions. The President's Climate Change Action Plan outlines a series of voluntary programs aimed at returning U.S. greenhouse gas emissions to 1990 levels by the year 2000 through reducing carbon emissions.

When considering the protocol for controlling carbon emissions, one may refer to the market-based sulphur dioxide ($SO_2$) allowance trading component of the Acid Rain Program. The Acid Rain Program allows electric utilities to adopt the most cost-effective strategy to reduce $SO_2$ emissions at generating units in their system. The Acid Rain Program Operating Permit outlines the specific program requirements and compliance options chosen by each source. Affected utilities are also required to install systems that continuously monitor emissions of $SO_2$ and other pollutants in order to track progress, ensure compliance and provide credibility to the trading component of the program.

A parallel program to trade carbon credits may be patterned after the $SO_2$ Allowance Trading System. The Administration recently proposed as yet unspecified emissions budgets that could be banked or traded among developed nations in order to reduce the levels of greenhouse gas emissions. According to the "Draft Protocol Framework," a procedure to ensure adequate reporting, measurement, review and compliance would need to be established. It would provide for "joint implementation" through which countries without emission budgets could create and transfer emission reduction credits, commonly called carbon credits, by those that do. A source of such carbon credits could be green plants or other photosynthetic organisms since they comprise a mechanism for cleansing or removing greenhouse gases from the atmosphere.

Using light energy from the sun, carbon from the air in the form of carbon dioxide and water in the soil, green leaves make sugar in a reaction called photosynthesis. A green plant can either use this energy for immediate growth or store it as starch for future use. Thus, plant growth, death and decay is a natural process which produces organic matter by removing carbon compounds from the atmosphere.

Organic matter is usually concentrated in the top few inches of many soils because most plant residue falls to the soil surface. Root decay also makes an important contribution to organic matter formation deeper in the soil. Soil formed under prairies or other grasslands, where roots are dense and evenly distributed through the top several feet, have a high concentration of soil organic matter. By definition, such organic matter is highly carbonaceous and represents conversion of atmospheric $CO_2$ to organic matter in the soil.

Though photosynthesis by plants will convert atmospheric carbon compounds into organic soil material, agricultural practices may impact upon the efficiency of plant conversion. It has been known for many years that cultivation and crop production generally results in a decrease of soil organic matter. University research in Illinois, Missouri, Oklahoma and Oregon have all shown that organic matter levels in the soil will decrease significantly after 30–40 years of cultivation because microorganisms feed on crop residue and soil organic matter exposed by tillage and readily convert the agricultural organic matter into $CO_2$ as an end product.

Also, plant residue from a previous crop is incorporated into the soil and gradually breaks down to form soil organic matter. Soil organic matter at this stage includes both plant and animal materials which contain large amounts of carbon. However, as a result of this decomposition, carbon dioxide builds up in soil air spaces and in solution with the soil. When the soil is tilled, a "burst" of $CO_2$ is released into the atmosphere. Simultaneously, oxygen enters the soil and shifts the whole reaction process to enhance organic decomposition which is an undesirable result.

On the other hand, because air makes up only 25–30% of soil volume, there may be little oxygen to oxidize the stored carbon from such organic matter and release it back into the atmosphere as carbon dioxide. This process of fixing and storing atmospheric carbon in a sink such as vegetation or soil is called carbon sequestration, and the problem facing scientists and engineers is how to properly quantify the process and enhance the process from a quantitative viewpoint.

Promotion of the photosynthetic process is thus a desirable goal. To promote active growth, and thus the photosynthesis process, a forage plant must continually undergo a level of partial defoliation during its growing season in a manner which does not restrict root growth and which encourages leaf growth. Plants cannot photosynthesize optimally unless they have green leafy material above the ground to absorb sunlight. Cutting and removing older plant growth stimulates growth which permits increased, more photosynthetically efficient new growth and contributes to greater sequestration of carbon by the plant.

Also, partial defoliation of grassy and herbaceous plants stimulates the root system to grow optimally and encourages the growth of new green leafy plant material. The importance of this in the process of fixing carbon above and below the soil in plant tissue is that when the plant is growing vigorously, the plant removes more airborne carbon (i.e. carbon dioxide) and converts it to sugars and starches during the process of photosynthesis. Increased root mass and leaf surface, which is not shaded by mature, inefficient photosynthesizing plant material, allows the plant to photosynthesize more efficiently and to persist and grow during periods of environmental stress. Further, vigorously growing plants begin growing earlier during their growing season and continue growing later in the growing season thereby causing the plant to extract more carbon from the air and fix more carbon in above-ground and below-ground plant tissue, i.e. leaves, stems and roots. Partial defoliation of the plant to achieve optimal plant growth resulting in maximum carbon sequestration can be accomplished through the cutting, collecting and measurement of grassy and herbaceous crops on a predetermined schedule, or in other words, by providing a prescribed level of defoliation.

A problem, therefore, relates to the development of methods and apparatus to promote green plant growth efficiently and to measure, quantitatively, the growth in standard, universally accepted units.

SUMMARY OF THE INVENTION

Briefly, the present invention comprises various methods, apparatus and techniques for measuring the amount of carbon sequestered by photosynthetic organisms such as green leafy plants. More particularly, by utilizing various assay methods, the quantitative amount of carbon sequestration in a given geographic area over a fixed time is determined taking into account process release of greenhouse gases as well as quantitative capture of carbon containing compounds from the atmosphere such as methane ($CH_4$) and carbon dioxide ($CO_2$).

Thus, we have discovered an important consequence of cutting and storing grassy and herbaceous crops by providing a method to weigh or otherwise measure growing and harvested plant material, after being corrected for moisture, for the purpose of determining amounts of $CO_2$ removed from the air. The method ensures adequate measurement of the amounts of carbon dioxide removed from the air and a reporting system which documents those amounts removed from the air. Because a living plant removes carbon dioxide from the air and the anthropogenic activities necessary for culturing the living plant may release carbon dioxide back into the atmosphere, the reporting system calculates net carbon sequestered. The difference between carbon dioxide released and carbon dioxide removed is then used to calculate the amount of carbon sequestered by the living plant in both those portions of the plant above and below the ground.

Thus it is an object of the invention to provide a method and apparatus for carbon sequestration.

A further object of the invention is to provide a method and apparatus for enhancement of quantitative carbon sequestration.

Another object of the invention is to provide apparatus and methods for credibly measuring the quantity of carbon dioxide removed from the atmosphere by sequestration methods.

Another object of the invention is to provide a method and apparatus that uniformly and fairly certify the measurements of carbon dioxide sequestration.

These and other objects, advantages and features of the invention will be set forth in the detailed description which follows.

BRIEF DESCRIPTION OF THE DRAWING

In the detailed description which follows, reference is to be made to the drawing comprised of the following figures.

DESCRIPTION OF THE PREFERRED EMBODIMENTS

Figure 1:
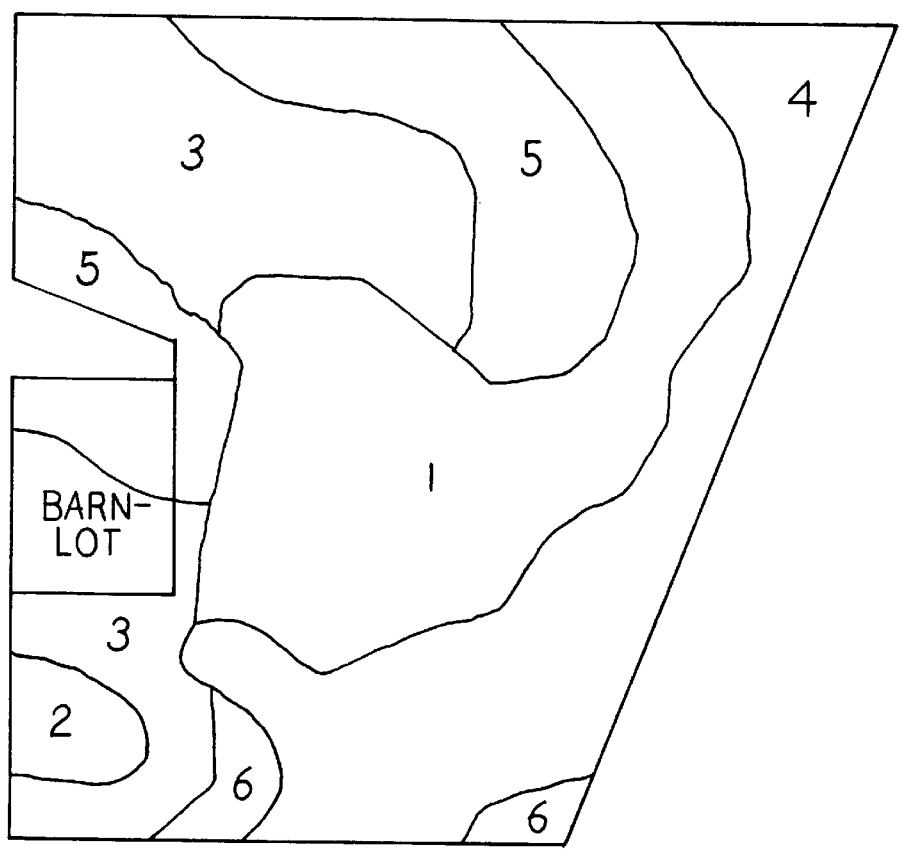
FIG. 1 is an example of a soil map of a geographical area using the invention.

Reservoirs of sequestered carbon are commonly referred to as "sinks". Sinks of sequestered carbon are found in the aerial portion of terrestrial plants (stems, leaves, flowers, seeds) and in the below-ground portion of plants (roots, bulbs, rhizomes, tubers). Woody plants, as well as grassy and herbaceous plants, sequester carbon. However, the amount of carbon sequestered in some woody plants is difficult to accurately measure in the living plant without destroying the plant. This is especially true in fruit and nut orchards, vineyards and some tree plantations. Many trees in tropical and boreal forests have branches and limbs of varying lengths, diameters and are irregularly spaced and shaped. Woody plants sequester a large part of their carbon above ground. This carbon is subject to release from intentional or unintentional fire, disease, decay, storms and insects. An example of the magnitude of this problem is illustrated by the following report:

In 1995, fires in Canada's boreal forest consumed more than 3 million acres an area ½ the size of the Netherlands. A study by Canadian Forest Service scientists concluded that the northern forest has lost almost ⅓ of its biomass in the last 20 years because of enormous increases in fires and insect outbreaks. Before 1970, the forest had absorbed 118 million tons of carbon each year according to the study, more than counterbalancing Canada's fossil fuel emissions. But in the last decade, that balance has shifted and the forest has absorbed an average of 57 million tons of carbon each year. (Study by Canadian Forest Service, Northern Forestry Centre, Reported by Greenpeace, Canada Press Release, Jun. 16, 1995.)

Thus, grassy and herbaceous plants appear to have advantages with respect to providing a carbon sink. Some of the advantages that grassy and herbaceous plants have over woody plants in the formation of carbon sinks are:

1. Grassy & herbaceous plants reach physiological maturity much sooner than woody plants and therefore can begin to sequester maximum amounts of carbon. In as little as sixty days from germination, annual grassy and herbaceous plants are sequestering maximum amounts of $CO_2$. Examples of these plants are sorghums, annual ryegrass, Egyptian clover and others. Perennial grassy and herbaceous plants generally take 1 to 2 growing seasons to reach physiological maturity before sequestering maximum amounts of $CO_2$. Actively managing annual and perennial grassy and herbaceous plants by providing optimal levels of fertilizer and with optimal defoliation stimulates the plant to photosynthesize at maximum levels, remove maximum amounts of $CO_2$ from the atmosphere and perpetuate the plant indefinitely.

2. Grassy and herbaceous plants are more widely adapted to climatic conditions than that of woody plants. They have the ability to flourish in marshes, prairies, and deserts. They can tolerate temperatures ranging from those found in the tropics to those found on the tundra.

3. Grassy and herbaceous plants are often seeded at rates ranging from 25,000 seeds per acre to rates exceeding 6.5 million seeds per acre. It is often desirable for these plants to produce sod. The leaves of the closely-spaced sod-forming plants intercept rainfall and protect the soil from erosion and increase water infiltration. The leaves act as solar collectors. Dense shards of actively growing grass are very efficient solar collectors and very effective at removing $CO_2$ from the air and storing carbohydrates in a sink at the base of expanding leaves, stems or roots.

4. Grassy and herbaceous plants are used as cover crops in some agro-forestry settings. Rows of orchard trees are often separated by strips of grass or legumes. The grasses and legumes protect the soil surface from erosion, create organic matter and fix nitrogen in the soil for the benefit of the tree.

Many grassy and herbaceous plants sequester equal amounts of carbon between the roots and the aerial portion of the plant. Certain grass species, however, that grow in an arid or semi-arid region may have root masses in excess of 5 times the amount of mass found in the aerial portion of the plant.

One embodiment of the method thus contemplates selectively cutting, collecting and measuring grassy and herbaceous crops on a predetermined schedule and provides for a prescribed level and technique of defoliation other than simple mowing. The method further provides a means for harvesting plant material and weighing or otherwise quantifying that material after it is corrected for moisture content for the purpose of determining the amount of carbon dioxide removed from the atmosphere within a certain geographic region.

Grassy and herbaceous plants store carbohydrates in plant tissues when photosynthesis produces energy (sugars) that exceeds the needs of the plant for respiration and growth. Roots, rhizomes, tubers and bulbs as well as other vegetative and reproductive tissues accumulate starches and carbohydrates in the plant. Carbon stored in plant tissue in the ground and in the soil itself is usually secure from fire and other forms of oxidation as long as the soil is not disturbed by tillage or drainage. Carbon in this form might be thought of as permanently sequestered carbon.

Carbon stored in the aerial portion of the plant is susceptible to oxidation, oftentimes by design. Also, the aerial sink of sequestered carbon is annually recycled for food for humans, feed for wild and domestic animals and fuel. The carbon released from forage plants or grain plants when they are consumed is equal to the amount of $CO_2$ the plant withdrew from the atmosphere during photosynthesis. Research conducted by the Bio-Fuels Feedstock Development Program (BFDP) at the Department of Energy's (DOE) Oak Ridge National Laboratory (ORNL) seems to suggest that, on a BTU basis, certain grassy plants specifically switchgrass (panicum virgatum) may emit about 17% less $CO_2$ upon combustion than bituminous coal. A coal-switchgrass blend has the potential to slow the build-up of $CO_2$ in the atmosphere. Bio-fuels are unlike fossil fuels in that, when combusted, bio-fuels emit only a portion of the $CO_2$ they removed during growth. (An equal amount is retained in the soil). This is in contrast to fossil fuels whereby these fuels simply release $CO_2$ into the atmosphere that had been ingeologic storage for millions of years.

Mowing or shredding by rotary, foil or similar type mowers, as a method of mechanical defoliation, only adjusts plant height. It detaches the upper portion of the plant and deposits that detached plant material unevenly on the stubble in wheel tracks in a form that is difficult or impossible to accurately collect. Additionally, the detached portion of the plant shades the remaining portion of the growing plant. Understory plants are often suppressed, thereby reducing overall photosynthetic activity. More importantly, there is very little, if any, net carbon sequestered in the above ground vegative sink from mowing because the detached plant material oxidizes and releases carbon dioxide back into the air. However, about one-half (½) of the carbon dioxide ($CO_2$) removed from the atmosphere may be retained as persistent carbon in the roots in the soil. The process of mowing usually involves the use of an internal combustion engine which uses a petroleum distillate as an energy source. For example, the combustion of gasoline releases approximately 19–20 lbs. of carbon dioxide into the air per gallon of gasoline combusted; the same is true for diesel fuel with approximately 20–26 lbs. of carbon dioxide being released per gallon of diesel use. Simply mowing the living plants potentially can release more carbon dioxide into the air than the growing, living plant can remove from the air especially if root growth is suppressed by a mowing protocol that does not allow sufficient regrowth of the above ground portion of the plant.

The present method therefore contemplates controlled defoliation and selective choice of grassy and herbaceous plants. Thus as a first step, the geographic region of controlled defoliation is established by metes and bounds. The herbaceous plants, grasses and photosynthetic materials within that region are then inventoried and the other relevant characteristics of the tract are also inventoried. For example, the type of soil, climatic conditions, length of growing season, rainfall, etc. are inventory information that relate to the specific tract in combination with the identification and classification of the plant material.

Typically, the method utilizes differentially corrected global positioning satellite (DGPS) technology to establish coordinates and measurements specific to a tract of land. These readily identifiable points fix the location of tracts and fix surface area amounts within the tract. Even quantitative data regarding crop condition on the tract may be determined. Surveys may also be used but are no longer necessary to generally establish perimeter boundaries. Subdivisions within the tract, necessary for optimal grassy and herbaceous plant production, can be calculated using this technology (DGPS) from remote locations using companion geographic information systems (GIS) technology. Integrated DGPS-GIS technology and satellite generated imagery are used to create base maps of growing and grazing areas (where relevant), to create a schedule for monitoring and measuring plant growth, and to coordinate mechanical or other defoliation of the growing plants. Processed satellite generated images of a growing and grazing area may be used to develop data sets which measure vegetative vigor.

Next, the plant material is detached at or near ground level using sickle bar cutters, disc mowers, or other suitable harvesting machines. The harvest is then collected by baling or other means, is weighed or otherwise measured so as to calculate the effective carbon content therefrom. Various specific species of plants are encouraged in their growth pattern and harvested. For example, eucalyptus trees, avocado trees and similar types of plants are known to regrow from a specific existing root system once the plant is cut. Thus, the photosynthetic process can be enhanced by cutting and removing the material to the stump and collecting the material while the plant then regrows from the stump.

Cloning of the particular herbaceous material to promote rapid growth characteristics and the bushiness of the plant (i.e., the square meters of leaf surface exposed to the sun or root mass) are also possible. The plants can then be processed in a manner by which the plant material can be combined with bacteria so that the carbon content of the plant will serve to enhance the new growth.

Thus, there should be two classes of carbon credits. A premium credit class or permanent credit can be a measurement of permanently sequestered carbon in the below-ground carbon sink associated with roots, etc. Biologically secondary or recyclable credits comprise a measurement of the carbon sink of above-ground sequestered carbon that has a variable and typically shorter life.

As another or alternative embodiment of the invention, in place of mechanical defoliation followed by analysis of the resultant photosynthetic growth and classification of carbon credits, i.e., quantification of the carbon sink, animal husbandry may be utilized in a method for quantitative analysis of photosynthetic growth. Thus, a use of grazing animals is that of being a device to harvest forage plant material for the purpose of determining sequestered carbon. Partial defoliation of the plant to achieve optimal plant growth resulting in maximum carbon sequestration is accomplished through the manipulation and management of multiple species of grazing animals and further by classes of animals within a species to achieve a predetermined, prescribed level of defoliation and carbon sequestration. Predictions of animal growth, lactation or general body condition can be made and verified through the use of readily available devices such as scales, or more sophisticated devices such as ultrasound or magnetic resonance imaging machines.

The method, for example, uses electronically identified grazing animals as devices to harvest forage plant material from site-specific areas. These animals have the ability to convert forage plants to weight gain or milk, for example. Observed changes in animal weight and appearance and measurable products, such as milk, are used to calculate the amount of plant material the animal ingested. From known amounts of ingested plant material from specific tracts of land, one can calculate total carbon sequestered by plant growth using Department of Energy or other formulas.

Again, the method begins by using differentially corrected global positioning satellite (DGPS) technology to establish coordinates specific to a tract of land. These readily and repeatedly identifiable points fix the location of grazing tracts and fix surface area amounts within the tract. Subdivisions within the tract, necessary for optimal grazing, can be calculated using this technology from remote locations using companion geographic information systems (GIS) technology. Integrated DGPS and GIS technology is used to create a schedule for controlled grazing and for monitoring it thereafter. The same integrated DGPS and GIS technology in combination with modular software can also track animal movement in dense cover (canyons, forest and brush) from remote locations. This allows the grazing manager to monitor and verify that certain specific animals grazed certain specific areas at certain specific times.

Grazing animals graze selectively. This phenomenon allows for a range of near total defoliation of certain plants, within an identified area, to almost negligible defoliation of certain plants in the same area. This is distinctly different from the action of a chemical or mixtures of chemical defoliants, that are selective for certain plants. The chemical mode of action which targets specific plants often destroys the plant. Destruction may not be appropriate in situations when only suppression is desired. The dead plant material shades the non-targeted plants and reduces their ability to photosynthesize optimally. In addition, many chemical herbicides are petroleum-based and carry use restrictions that may not make them appropriate choices for defoliants in sensitive watershed areas or other critical lands.

In review, the amounts of carbon sequestered by plant tissue above and below the soil surface and stored in the soil itself is determined through the performance of a series of steps. First, there is established a boundary of a tract of land for which the quantification is to be defined. The boundaries may be established using satellite technology as previously referenced or normal surveying technology. Next, there is introduced into the region defoliation techniques including or such as various grazing animals in a defined number and a defined species or mixture of species. The animals introduced into the region are identified by any of various means including branding or tattooing. They also may be, and typically are, equipped with a signal generating device which has a recordation of the various attributes of the animal at the beginning or set time zero of the measuring period and preferably includes means for measuring changes in the original setting of attributes. For example, the species' age, weight, body condition, body percentage attributable to fat and other physical characteristics of the animal are initially recorded and continuously updated. The animals are then maintained in the measured tract for a specific period of time. Simultaneously, a data base relating to the foliage in the area is compiled.

During a set time period, the grazing animals will partially defoliate the foliage in the tract. After a given period of time, the condition and the height of the foliage is again measured and there is calculated therefrom, and from the animals' changing condition, an amount of foliage consumed by the animals. This number is then converted into a calculation of the enhanced growth rate of the foliage in the geographical tract. This enhanced growth pattern will provide an indication of the amount of carbon compounds carried by the plants through the photosynthesis process. Factored into this calculation will be the enteric release of gases by the grazing animals as well as any internal combustion type uses in order to control the animals during the grazing period so that a net calculation of carbon credits can be ascertained. Also, factored in will be the grassy or herbaceous plant material or species utilized for the sequestration process. Those carbon credits will then be certified through an appropriate standardization and necessary governmental authority after which the credits may be traded through a mercantile exchange of one nature or another. A typical purchaser of such credits may well be a coal company or a power generating company.

Following are examples of the method of the invention and a discussion of apparatus for practicing the method. As a first step in an effort to sequester greenhouse gases, one may inventory the geographic area involved, for example. Consider the following with respect to the continental United States:

CHART 1

CARBON SEQUESTRATION CALCULATIONS
Breakdown of United States Land Base

| | |
|---|---|
| Private Land | 1375 million acres |
| Public Land | |
| State and Local | 108 million acres |
| Federal | 408 million acres |
| Rural Land | 1391 million acres |
| Cropland | 382 million acres |
| CRP | 36 million acres |
| Pasture | 125 million acres |
| Range | 399 million acres |
| Forest | 395 million acres |
| Miscellaneous | 55 million acres |
| Lands available for grassy and herbaceous crops | 942 million acres |

Utilizing these calculations as a basis for identification of candidate regions for the growth of various plants, one can calculate the amount of sequestered carbon associated with such regions as in Chart II:

CHART II

CARBON SEQUESTRATION
CALCULATIONS OF PERMACULTURE
(CRP Pasture and Rangeland)

Crested Wheat Grass   12" mean annual precipitation (map)

Pacific Northwest & Great Basin States
Annual Production    3000 lbs. hay per acre
                      6500 lbs. roots per acre
Carbon Equivalent   3000 lbs. × 45%   = 1350
                      6500 lbs. × 55%   = 3575
   Total Carbon Sequestered        = 4925 lbs.
Carbon Credits (OTC's Market Value):  $50 per ton  = $.025/lb.
                                              $10 per ton  = $.005/lb.
Earnings Potential:
   4925 lbs. × $.025/lb. = $123.12 per acre -continued

CHART II

CARBON SEQUESTRATION
CALCULATIONS OF PERMACULTURE
(CRP Pasture and Rangeland)

4925 lbs. × $.005/lb. = $ 24.62 per
   acre × 399 million acres × $9,823,000,000
Smooth Brome Grass      30–40" map Great Lakes States; Upper South
Annual Production    7000 lbs. hay per acre
                      7740 lbs. roots per acre
Carbon Equivalent   7000 lbs. × 45%   = 3150
                      7740 lbs. × 55%   = 4257
   Total Carbon Sequestered        = 7407 lbs.
Earnings Potential:
   7407 lbs. × $.025/lb. = $185.17 per acre
   7407 lbs. × $.005/lb. = $ 37.03 per
   acre × 125 million acres = $4,628,750,000

With regard to Chart II, the following is noted: CRP means Conservation Reserve Program. Carbon equivalent is calculated as a percentage of the weight based upon dry matter weights of above ground and below ground plant material, i.e., grassy and/or herbaceous material. In general terms, the composition of a typical plant on a dry matter basis is 45% carbon in the above ground portion of the plant and 55% carbon in the below ground portion of the plant. (Adapted from Barden, Halfacre, and Parrish 1987).

A further example is set forth in Chart III relating to hay land and hay plants.

CHART III

CARBON SEQUESTRATION CALCULATIONS
ON HAYLAND (BIO-FUELS)

40 Acre Hayfield   90% Alfalfa   10% Orchardgrass
Yield:

1st cutting     3 tons/acre
   2nd cutting   1.8 tons/acre
   3rd cutting   1.2 tons/acre
Total Air Dry (90% dry matter) Production = 6 tons/acre
   Alfalfa Dry Matter = 90% × 5.4 = 4.86 tons/acre
   Grass Dry Matter = 10% × 5.4 = .54 tons/acre
Carbon Credit Calculations:

Alfalfa:
   Above Ground   45% × 4.86 tons/acre =   2.187 tons carbon/acre
   Below Ground   55% × 4.86 tons/acre × 3 =   2.673 tons carbon/acre
Grass:
   Above Ground   45% × .54 tons/acre =   .243 tons carbon/acre
   Below Ground   55% × .54 tons/acre × 1.1 =   .29 tons carbon/acre
TOTAL CARBON SEQUESTERED   =   5.393 tons carbon/acre Earnings Potential:
   Carbon @ $10.00/ton × 5.393 tons/acre × 40 acres =   $ 2,157.20
   Carbon @ $50.00/ton × 5.393 tons/acre × 40 acres =   $10,786.00

NOTE:
Because haying requires mechanical equipment, the fuel spent producing hay tonnages must be deducted from the total amounts of carbon sequestered.
NOTE:
If they hay is removed and sold for either feeding or bio-fuels, the carbon content in the tons of dry matter would transfer to the buyer, i.e. utility or hay merchant.

CHART IV

CARBON SEQUESTRATION CALCULATIONS ON ANNUAL CROPLAND

| Annual Crops (e.g. corn) Annual Production | Carbon flows need to be considered 120 bu. Grain per acre = 6720 lbs. per acre Residue (shucks, cobs, leaves, stems) = 6000 lbs. per acre Roots = 12,000 lbs. per acre | | |
|---|---|---|---|
| Carbon Equivalent | 6720 lbs. × 45% | = | 3024 |
| | 6000 lbs. × 45% | = | 2700 |
| | 12,000 lbs. × 55% | = | 6600 |
| Total Carbon Sequestered | | = | 12,324 lbs. |

Comparison of net carbon sequestered by two tillage systems for growing systems for growing corn:

Assumptions:
1) use same annual production and carbon equivalent from above for both tillage systems;
2) carbon loss from conventional (mold board) plowing is equal to 134% of the carbon sequestered in crop residue, including roots;
3) carbon loss from no-till is equal to 27% of the carbon sequestered in crop residue, including roots:
4) conventional tillage uses 6.6 gals. of residue fuels (#2 diesel) per acre (Siemens, Griffith, & Parsons, Nat. Corn Handbook);
5) no-till uses 1.65 gals. or residual fuels (#2 diesel) per arce (Siemens, Griffith & Parsons, Nat. Corn Handbook);
6) Emissions for diesel = 7.08 lbs. carbon/gal.

Calculations:

Conventional tillage:
| Carbon content of crop residue | 6,000 lbs. × 45% | = | 2700 lbs. |
|---|---|---|---|
| Carbon content of roots | 12,000 lbs. × 55% | = | 6600 lbs. |
| Total carbon available to go back into soil | | = | 9300 lbs. |

Carbon lost by conventional tillage = 9300 lbs. × 134% = 12,464 lbs.

No-Till:
| Carbon content of crop residue | 6,000 lbs. × 45% | = | 2700 lbs. |
|---|---|---|---|
| Carbon content of roots | 12,000 lbs. × 55% | = | 6600 lbs. |
| Total carbon available to go back into soil | | = | 9300 lbs. |

Carbon lost by no-till = 9300 lbs. × 27% = 2511 lbs.

A. Amount of carbon saved through change in tillage practices:
12,464 lbs. − 2511 lbs. = 9951 lbs.

B. Fuel Savings:
| Fuel Used by Conventional tillage | 6.6 gal./acre |
|---|---|
| Less Fuel used by No-Till | 1.54 gal./acre |
| Difference in fuel used | 4.95 gal./acre |

Difference in fuel × emissions for diesel = Lbs. of carbon saved by change in tillage
4.95 gal./acre × 7.08 lbs. carbon/gal. = 35 lbs. of carbon/acre saved C. Total Carbon Savings = 9951 lbs. + 35 lbs. = 9986 lbs. of carbon per acre D. Earnings Potential:
9986 lbs. × $.025/lb. = $249.65 per acre
9986 lbs. × $.005/lb. = $ 49.93 per acre × 80 million acres = $3,994,400,000

Revenue to pay for the carbon credits and thus create an incentive to establish greenhouse gas sequestration may be generated by a surcharge on fuels in accord with Chart IV.

CHART V

CARBON CREDIT BUNDLING WITH FUEL

Assume: Gasoline emits 19 lbs. of $CO_2$ per gallon combusted
Diesel emits 26 lbs. of $CO_2$ per gallon combusted
Carbon credits @ $10/ton or $.005/lb.

If you bundle carbon credits with the sale of gasoline:
19 lbs. × $.005/lb. = $.089 gallon

CHART V

CARBON CREDIT BUNDLING WITH FUEL

If you bundle carbon credits with the sale of diesel:
26 lbs. × $.005/lb. = $.13/gallon If you bundle carbon credit with 1 bu. Corn (ethanol):
56 lbs. × 45% = 25.2 lbs. carbon/bu. × $.005/lb. = $1.26/bu.

Thus the extra revenues associated with or taxed onto fuel sales will be used to pay the creators of the greenhouse gas collection plots or regions exemplified by Charts I, II and III and a market or exchange system can be adopted to facilitate the transactions.

As detailed herein, there are multiple ways to develop so-called carbon credits. One way is to merely plant, grow, defoliate and collect various grasses and green plants as described. Such plants may or may not be harvested or trimmed in whole or part. In another method to effect carbon sequestration, animals may be used to accentuate crop growth and to enhance the return on investment in the grasses or crops by virtue of growing the animals for market. By analyzing animal growth, a certifiable carbon credit value may be obtained. Following is an example of such an animal husbandry method:

Cattle Husbandry

A central Illinois farm consists of all highly erodible soil types in permanent perennial vegetation with certain areas overseeded to summer annuals. The objective is to produce approximately 500 lbs. of beef per acre in two grazing cycles—one starting around April 1 and the other starting around September 15. A customer base will buy calves directly from the farm. An alternative marketing program is to market the cattle through Illinois livestock auctions.

Production Costs

A projected budget for the Fall 1997 grazing season is illustrated below.

BUDGET-FALL 1997

| Returns from cattle on 30 acres | Total $ | 6640 animal days $ Per Acre |
|---|---|---|
| VARIABLE COSTS: | | |
| Outbound Ave. Wt. (Feb. 28, 1998) 40 head 674 @ .77 | $20,759 | $691.97 |
| Inbound Ave. Wt. (Sept. 15, 1997) 40 head 425 @ .82 | $13,940 | $464.66 |

$$\text{Value of gain} = \frac{\$691.97 - \$464.66}{249 \text{ lbs.}} = \$0.912$$

| OTHER VARIABLE COSTS: | | |
|---|---|---|
| Mineral & Salt (1.6 oz./head/day) | $1195.20 | $39.84 |
| Fish meal (6 oz./head/day) | 996.00 | 33.20 |
| Vet Med | 45.00 | 1.50 |
| Hauling & Commissions | 300.00 | 10.00 |
| Fertilizer | 600.00 | 20.00 |
| Death loss 1% | | 4.64 |
| Interest (15000 @ 10%) | 750.00 | 25.00 |
| Total Other Variable Costs | | $134.18 |

Total Other Variable Cost of Gain = 134.18/249 lbs. = $0.538/lb
Total Variable Costs: $134.18 + $464.66 = $598.84

Soil on such a farm does not lend itself to cash crop production. FIG. 1 illustrates the soil makeup of the test plot.

Figure 2:
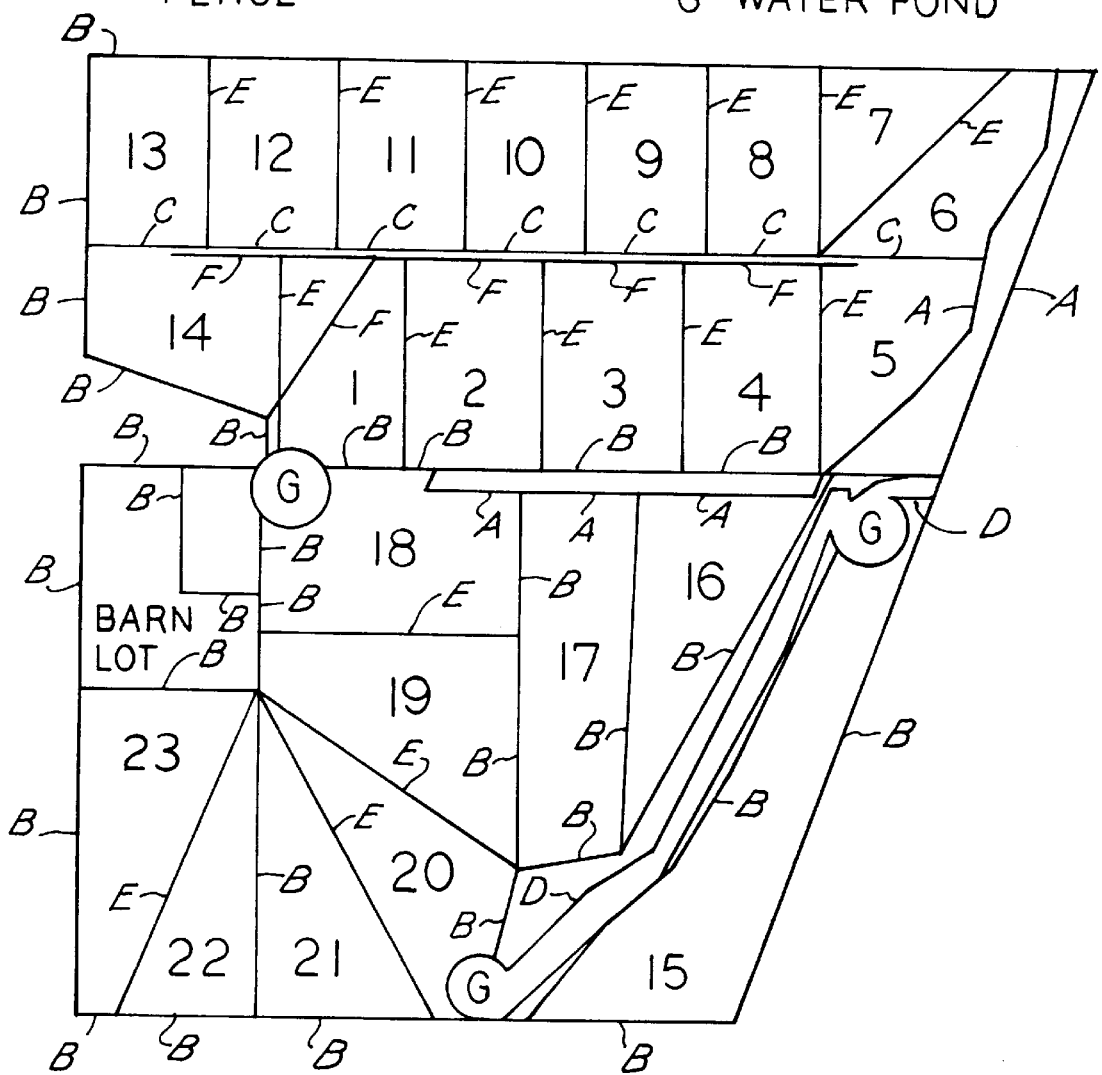
FIG. 2 is a subplot map of FIG. 1.
Figure 3:
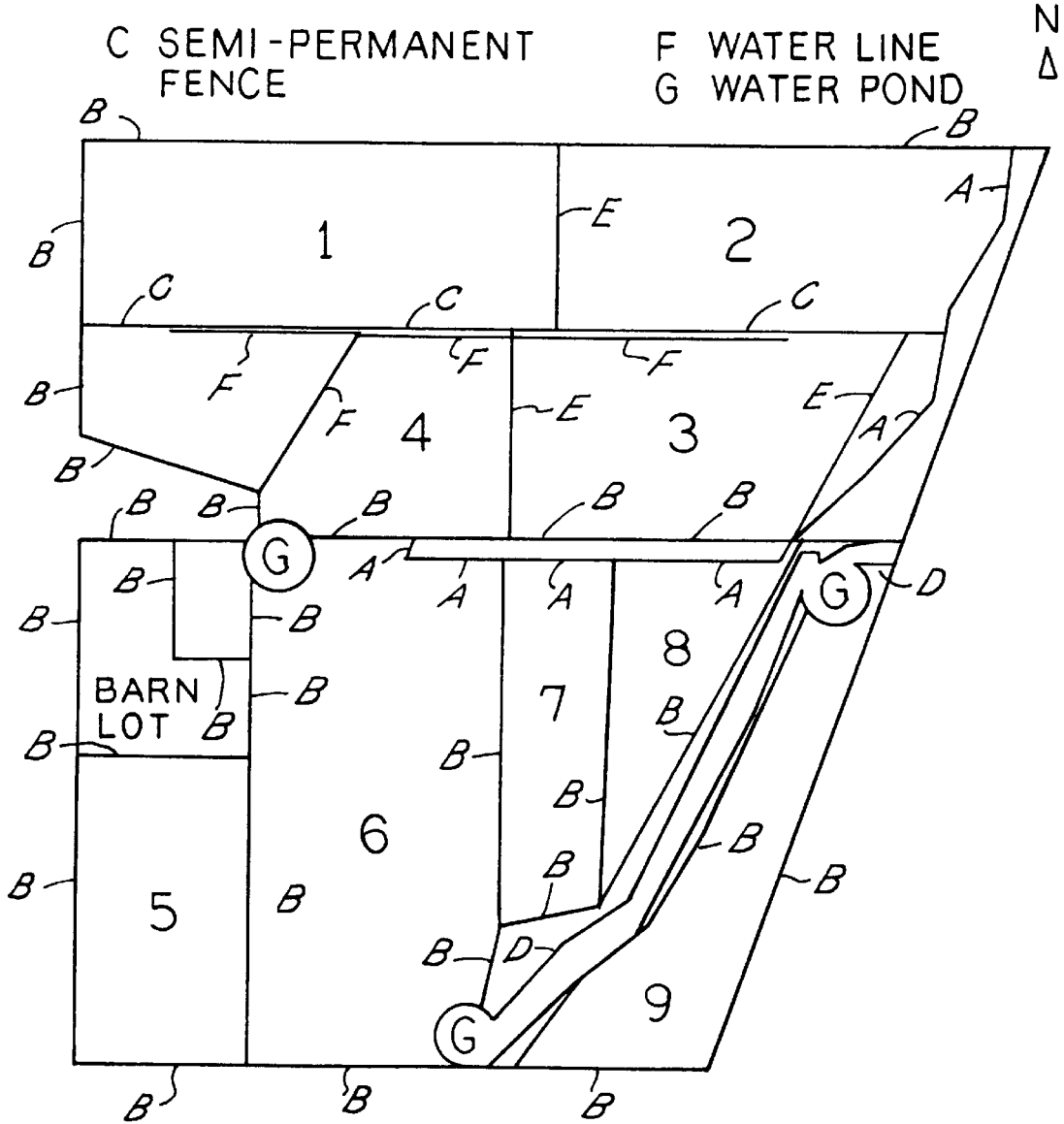
FIG. 3 is another subplot map of FIG. 1.
Figure 4:
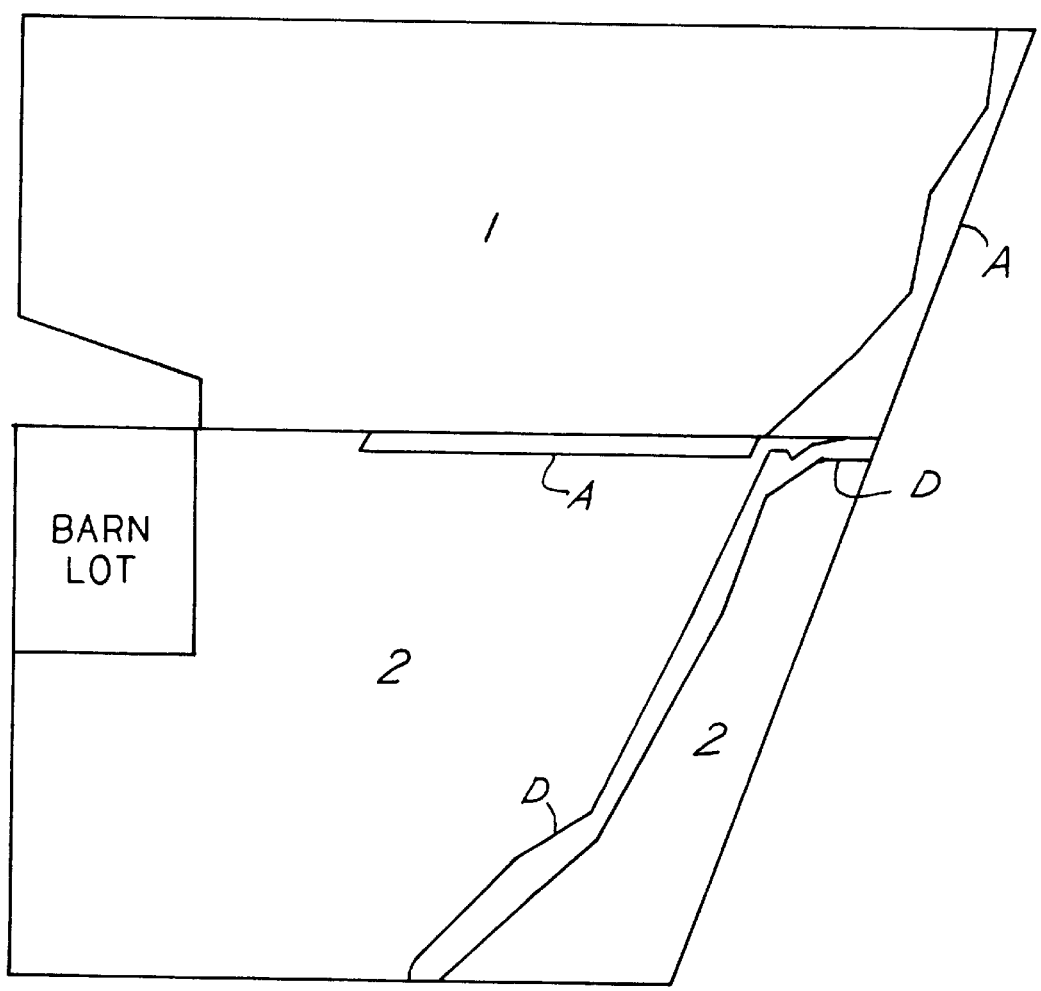
FIG. 4 is a chart of grass plantings.

To maximize grass and plant growth, the land is divided into cells or subplots for summer grazing (FIG. 2) and winter grazing (FIG. 3). Grasses are planted on the plots as shown in FIG. 4. Chart VI correlates the cell or subplot areas with grasses:

using DGPS-GIS technology or other land surveying protocols. Each movement is accompanied by data collection including cattle weight and grass height.

Chart VII is a calculation of carbon credits generated from the process.

CHART VI
FORAGE DATABASE

| SUMMER CELL # | CELL AREA | TYPE OF GRASS | SOIL TYPE | PROD. INDEX |
|---|---|---|---|---|
| 1 | 1.16 Acres | Orchardgrass/Legumes | 145C2-Saybrook; | 132 |
| | | | 56B-Dana; | 139 |
| | | | 221C2-Parr | 122 |
| 2 | 1.22 Acres | Orchardgrass/Legumes | 145C2-Saybrook; | 132 |
| | | | 221C2-Parr | 122 |
| 3 | 1.33 Acres | Orchardgrass/Legumes | 145C2-Saybrook; | 132 |
| | | | 56B-Dana; | 139 |
| | | | 221C2-Parr | 122 |
| 4 | 1.26 Acres | Orchardgrass/Legumes | 56B-Dana | 139 |
| | | | 221C2-Parr | 122 |
| 5 | 1.52 Acres | Orchardgrass/Legumes | 74-Radford | 140 |
| | | | 221C2-Parr | 122 |
| 6 | 1.24 Acres | Orchardgrass/Legumes | 74-Radford | 140 |
| | | | 221C2-Parr | 122 |
| 7 | .84 Acres | Orchardgrass/Legumes | 74-Radford | 140 |
| | | | 221C2-Parr | 122 |
| 8 | .94 Acres | Orchardgrass/Legumes | 56B-Dana | 139 |
| | | | 221C2-Parr | 122 |
| 9 | 1.03 Acres | Orchardgrass/Legumes | 145C2-Saybrook | 132 |
| | | | 56B-Dana | 139 |
| 10 | 1.00 Acres | Orchardgrass/Legumes | 145C2-Saybrook | 132 |
| | | | 56B-Dana | 139 |
| 11 | 1.08 Acres | Orchardgrass/Legumes | 145C2-Saybrook | 132 |
| | | | 56B-Dana | 139 |
| 12 | 1.09 Acres | Orchardgrass/Legumes | 145C2-Saybrook | 132 |
| 13 | .96 Acres | Orchardgrass/Legumes | 145C2-Saybrook | 132 |
| 14 | 1.26 Acres | Orchardgrass/Legumes | 56B-Dana | 139 |
| | | | 145C2-Saybrook | 132 |
| 15 | 2.49 Acres | Fescue/Bluegrass | 74-Radford | 140 |
| | | | 27C2-Miami | 113 |
| 16 | 1.62 Acres | Fescue/Bluegrass | 221C2-Parr | 122 |
| | | | 74-Radford | 140 |
| 17 | 1.83 Acres | Fescue/Bluegrass | 221C2-Parr | 122 |
| | | | 74-Radford | 140 |
| 18 | 1.83 Acres | Fescue/Bluegrass | 56B-Dana | 139 |
| | | | 145C2-Saybrook | 132 |
| | | | 221C2-Parr | 122 |
| 19 | 1.60 Acres | Fescue/Bluegrass | 145C2-Saybrook | 132 |
| | | | 221C2-Parr | 122 |
| | | | 74-Radford | 140 |
| 20 | 1.29 Acres | Fescue/Bluegrass | 74-Radford | 140 |
| | | | 27C2-Miami | 113 |
| | | | 145C2-Saybrook | 132 |
| 21 | 1.17 Acres | Fescue/Bluegrass | 145C2-Saybrook | 132 |
| | | | 27C2-Miami | 113 |
| | | | 171B-Catlin | 144 |
| 22 | .88 Acres | Fescue/Bluegrass | 145C2-Saybrook | 132 |
| | | | 171B-Catlin | 144 |
| 23 | 1.49 Acres | Fescue/Bluegrass | 145C2-Saybrook | 132 |
| | | | 171B-Catlin | 144 |

Figure 5:
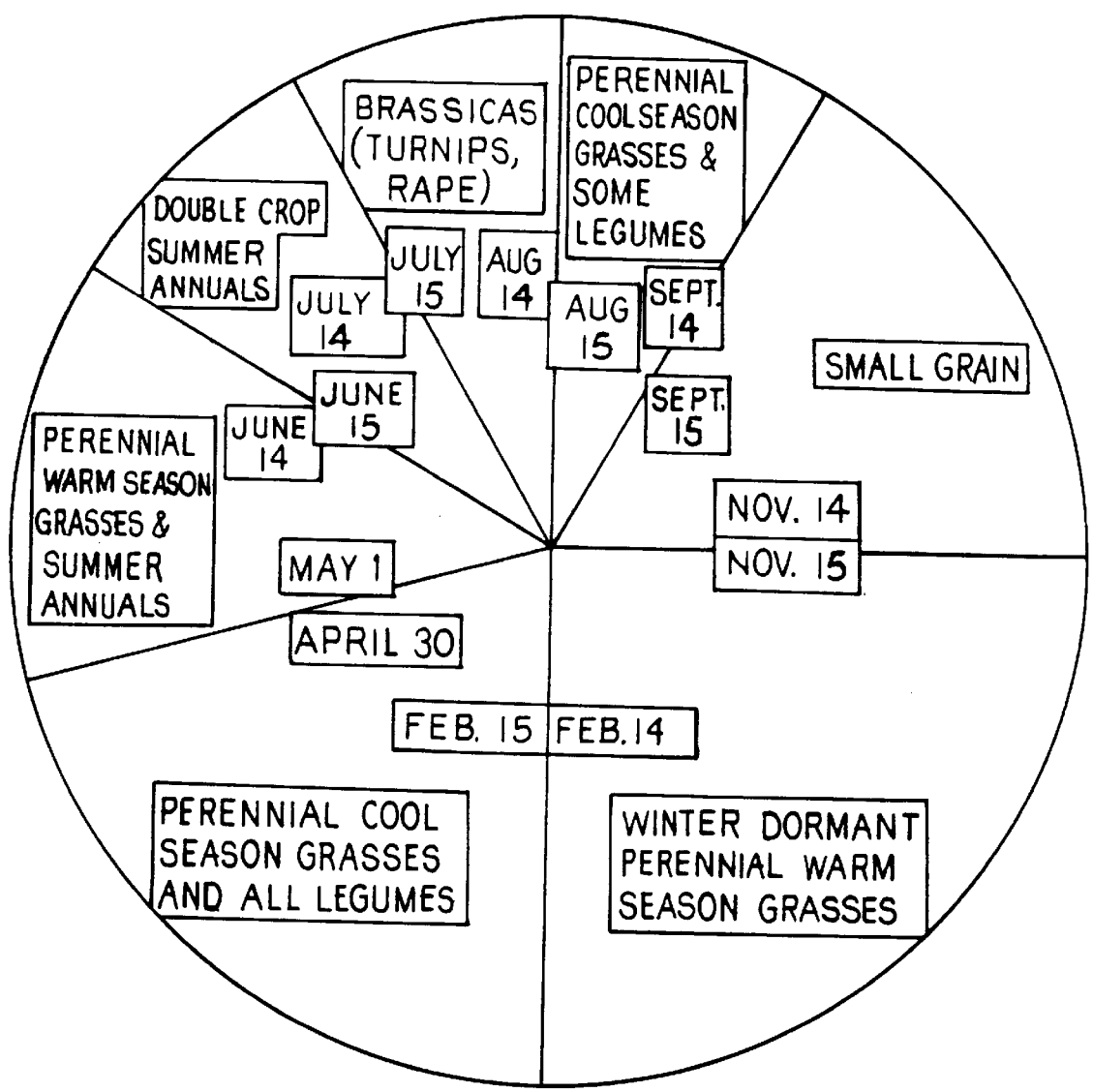
FIG. 5 is a seeding schedule.

Seeding is effected in accord with a schedule reported by FIG. 5. November through March is a dormant season. Grasses grow during the remainder of the year. Two groups of the calves are fed off of the grasses moving from cell to cell in a summer season (April–August) for one group and a second or winter group moving from winter cell to cell during September through March. Movement from cell to cell (subplot or paddock) is effected on a 1–3 day cycle or as described in a specific, controlled defoliation schedule, i.e. grazing plan, specific to a grazing area or areas identified

CHART VII

CARBON CREDIT CALCULATION ON 30 ACRES
From Fall 1997 Budget

| | | |
|---|---|---|
| Total Outbound Weight | 26,960 lbs. | |
| Total Inbound Weight | 17,000 lbs. | |
| Total Gain | | 9,960 lbs. |
| Gain per Acre (9960/30 Ac) | | 332 lbs. |

CHART VII

CARBON CREDIT CALCULATION ON 30 ACRES
From Fall 1997 Budget

Grass Conversion Efficiency from Literature 8.5 lbs. grass (dry matter) = 1 lb. animal gain
Total Lbs. of Gain converted to Grass
    9960 lbs. gain × 8.5 lbs. = 84,660 lbs. grass
Literature Value: % Carbon in Grass Herbage = 45%

Total Lbs. of Carbon Sequestered from Grass
    45% × 84,660 lbs. grass = 38,097 lbs. carbon
Ratio of Root Growth to Top Growth in Orchardgrass
(from Literature) 1.1:1
Total Lbs. of Root Growth
    84660 lbs. grass × 1.1     =     93126 lbs. of roots

CHART VII

CARBON CREDIT CALCULATION ON 30 ACRES
From Fall 1997 Budget

Literature Value: % Carbon in Grass Roots = 55%

Total Lbs. of Carbon Sequestered in Roots
    55% × 93126 lbs. roots     =     51,219 lbs. carbon
Total Lbs. of Carbon in Herbage & Root Growth
    38,097 lbs. (herbage) + 51,219 lbs. (roots) =
    83,316 lbs. or 44.658 tons
Tons of Carbon per Acre
    44.658 tons/30 acres = 1.4886 tons per acre of carbon sequestered Chart VIII illustrates the correlation between plant consumption and animal weight. Data of this type is then used in accord with Chart VII to calculate carbon credits.

CHART VIII
CHART SHOWING RELATIONSHIP BETWEEN BODY WEIGHT AND DRY MATTER CONSUMPTION PER HEAD PER DAY

| Week | Weight @ 1.5 | Dry Matter/ Head/ Day lbs./day | Weight @ 1.8 | Dry Matter/ Head/ Day lbs./day | Weight @ 2.0 | Dry Matter/ Head/ Day lbs./day | Weight @ 2.2 | Dry Matter/ Head/ Day lbs./day | Weight @ 2.4 | Dry Matter/ Head/ Day lbs./day |
|---|---|---|---|---|---|---|---|---|---|---|
| 1 | 300.0 | 9.00 | 300.0 | 9.00 | 300.0 | 9.00 | 300.0 | 9.00 | 300.0 | 9.00 |
| 2 | 310.5 | 9.32 | 312.6 | 9.37 | 314.0 | 9.42 | 315.4 | 9.46 | 316.8 | 9.50 |
| 3 | 321.0 | 9.63 | 325.2 | 9.75 | 328.0 | 9.84 | 330.8 | 9.92 | 333.6 | 10.00 |
| 4 | 331.5 | 9.95 | 337.8 | 10.13 | 342.0 | 10.26 | 346.2 | 10.38 | 350.4 | 10.51 |
| 5 | 342.0 | 10.26 | 350.4 | 10.51 | 356.0 | 10.68 | 361.6 | 10.84 | 367.2 | 11.01 |
| 6 | 352.5 | 10.58 | 363.0 | 10.89 | 370.0 | 11.10 | 377.0 | 11.31 | 384.0 | 11.52 |
| 7 | 363.0 | 10.89 | 375.6 | 11.26 | 384.0 | 11.52 | 392.4 | 11.77 | 400.8 | 12.02 |
| 8 | 373.5 | 11.20 | 388.2 | 11.64 | 398.0 | 11.94 | 407.8 | 12.23 | 417.6 | 12.52 |
| 9 | 384.0 | 11.52 | 400.8 | 12.02 | 412.0 | 12.36 | 423.2 | 12.69 | 434.4 | 13.03 |
| 10 | 394.5 | 11.83 | 413.4 | 12.40 | 426.0 | 12.78 | 438.6 | 13.15 | 451.2 | 13.53 |
| 11 | 405.0 | 12.15 | 426.0 | 12.78 | 440.0 | 13.20 | 454.0 | 13.62 | 468.0 | 14.04 |
| 12 | 415.5 | 12.46 | 438.6 | 13.15 | 454.0 | 13.62 | 469.4 | 14.08 | 484.8 | 14.54 |
| 13 | 426.0 | 12.78 | 451.2 | 13.53 | 468.0 | 14.04 | 484.8 | 14.54 | 501.6 | 15.04 |
| 14 | 436.5 | 13.09 | 463.8 | 13.91 | 482.0 | 14.46 | 500.2 | 15.00 | 518.4 | 15.55 |
| 15 | 447.0 | 13.41 | 476.4 | 14.29 | 496.0 | 14.88 | 515.6 | 15.46 | 535.2 | 15.96 |
| 16 | 457.5 | 13.72 | 489.0 | 14.67 | 510.0 | 15.30 | 531.0 | 15.93 | 552.0 | 16.56 |
| 17 | 468.0 | 14.04 | 501.6 | 15.04 | 524.0 | 15.72 | 546.4 | 16.39 | 568.8 | 17.06 |
| 18 | 478.5 | 14.35 | 514.2 | 15.42 | 538.0 | 16.14 | 561.8 | 16.84 | 585.6 | 17.56 |
| 19 | 489.0 | 14.67 | 526.8 | 15.80 | 552.0 | 16.56 | 577.2 | 17.31 | 602.4 | 18.07 |
| 20 | 499.5 | 14.98 | 539.4 | 16.18 | 566.0 | 16.98 | 592.6 | 17.77 | 619.2 | 18.51 |
| 21 | 510.0 | 15.30 | 552.0 | 16.56 | 580.0 | 17.40 | 608.0 | 18.24 | 636.0 | 19.08 |
| 22 | 520.5 | 15.61 | 564.6 | 16.93 | 594.0 | 17.82 | 623.4 | 18.70 | 652.8 | 19.58 |
| 23 | 531.0 | 15.93 | 577.2 | 17.31 | 608.0 | 18.24 | 636.8 | 19.16 | 669.6 | 20.06 |
| 24 | 541.5 | 16.24 | 589.8 | 17.69 | 622.0 | 18.66 | 654.2 | 19.62 | 686.4 | 20.59 |
| 25 | 552.0 | 16.56 | 602.4 | 18.07 | 636.0 | 19.08 | 669.6 | 20.08 | 703.2 | 21.09 |
| 26 | 562.5 | 16.87 | 615.0 | 18.45 | 650.0 | 19.50 | 685.0 | 20.55 | 720.0 | 21.60 |
| 27 | 573.0 | 17.19 | 627.6 | 18.82 | 664.0 | 19.92 | 700.4 | 21.01 | 736.8 | 22.10 |
| 28 | 583.5 | 17.50 | 640.2 | 19.20 | 678.0 | 20.34 | 715.8 | 21.47 | 753.6 | 22.60 |
| 29 | 594.0 | 17.82 | 652.8 | 19.58 | 692.0 | 20.76 | 731.2 | 21.93 | 770.4 | 23.11 |
| 30 | 604.5 | 18.13 | 665.4 | 19.96 | 706.0 | 21.18 | 746.6 | 22.39 | 787.2 | 23.61 |
| 31 | 615.0 | 18.45 | 678.0 | 20.34 | 720.0 | 21.60 | 762.0 | 22.86 | 804.0 | 24.12 |
| 32 | 625.5 | 18.76 | 690.6 | 20.71 | 734.0 | 22.02 | 777.4 | 23.32 | 820.8 | 24.62 |
| 33 | 636.0 | 19.08 | 703.2 | 21.09 | 748.0 | 22.44 | 792.8 | 23.78 | 837.6 | 25.12 |
| 34 | 646.5 | 19.39 | 715.8 | 21.47 | 762.0 | 22.88 | 808.2 | 24.24 | 854.4 | 25.63 |
| 35 | 657.0 | 19.71 | 728.4 | 21.85 | 776.0 | 23.28 | 823.6 | 24.70 | 871.2 | 26.13 |
| 36 | 667.5 | 20.02 | 741.0 | 22.23 | 790.0 | 23.70 | 839.0 | 25.17 | 888.0 | 26.64 |
| 37 | 678.0 | 20.34 | 753.6 | 22.60 | 804.0 | 24.12 | 854.4 | 25.63 | 904.8 | 27.14 |
| 38 | 688.5 | 20.65 | 766.2 | 22.98 | 818.0 | 24.54 | 869.8 | 26.09 | 821.6 | 27.64 |
| 39 | 699.0 | 20.97 | 778.8 | 23.36 | 832.0 | 24.96 | 885.5 | 26.55 | 938.4 | 28.15 |
| 40 | 709.5 | 21.28 | 791.4 | 23.74 | 846.0 | 25.38 | 900.6 | 27.01 | 955.2 | 28.65 |
| 41 | 720.0 | 21.60 | 804.0 | 24.12 | 860.0 | 25.80 | 916.0 | 27.48 | 972.0 | 29.16 |
| 42 | 730.5 | 21.92 | 816.6 | 24.48 | 874.0 | 26.22 | 931.4 | 27.94 | 988.8 | 29.66 |

-continued

CHART VIII
CHART SHOWING RELATIONSHIP BETWEEN
BODY WEIGHT AND DRY MATTER CONSUMPTION PER HEAD
PER DAY

| Week | Weight @ 1.5 lbs./day | Dry Matter/ Head/ Day | Weight @ 1.8 lbs./day | Dry Matter/ Head/ Day | Weight @ 2.0 lbs./day | Dry Matter/ Head/ Day | Weight @ 2.2 lbs./day | Dry Matter/ Head/ Day | Weight @ 2.4 lbs./day | Dry Matter/ Head/ Day |
|---|---|---|---|---|---|---|---|---|---|---|
| 43 | 741.0 | 22.23 | 829.2 | 24.87 | 888.0 | 26.64 | 946.8 | 28.40 | 1005.6 | 30.16 |
| 44 | 751.S | 22.54 | 841.8 | 25.25 | 902.0 | 27.06 | 962.2 | 28.86 | | |
| 45 | 762.0 | 22.86 | 854.4 | 25.63 | 916.0 | 27.48 | 977.6 | 29.32 | | |
| 46 | 772.5 | 23.16 | 867.0 | 26.01 | 930.0 | 27.90 | 993.0 | 29.79 | | |
| 47 | 783.0 | 23.49 | 879.6 | 26.38 | 944.0 | 28.32 | 1008.4 | 30.25 | | |
| 48 | 793.5 | 23.80 | 892.2 | 26.76 | 958.0 | 28.74 | | | | |
| 49 | 804.0 | 24.12 | 904.8 | 27.14 | 972.0 | 29.16 | | | | |
| 50 | 814.5 | 24.42 | 917.4 | 27.52 | 986.0 | 29.58 | | | | |
| 51 | 825.0 | 24.75 | 930.0 | 27.90 | 1000.0 | 30.00 | | | | |
| 52 | 835.5 | 25.06 | 942.6 | 28.27 | | | | | | |
| 53 | 846.0 | 25.38 | 955.2 | 28.65 | | | | | | |
| 54 | 856.5 | 25.69 | 967.8 | 29.03 | | | | | | |

CONCLUSION

The carbon credits may be marketed to refiners and businesses which generate greenhouse gases. The business can purchase the credits and be certified to sell an equivalent amount of fuel. Failure to market certified fuel or products will preclude the opportunity to market the products or alternatively will require payment of a double surtax for example.

There are numerous variations of the method and apparatus disclosed. The invention is thus limited only by the following claims and equivalents.

We claim:

1. A method for measuring carbon credits to be sold to a purchaser of carbon credits, the method comprising the steps of:

establishing metes and bounds of a tract of land;
   providing ruminant grazing animals to said tract;
   initially recording initial animal condition;
   compiling a database of information specific to the tract of land comprised of information on soil types, levels of fertility, inventories of forage plants, climatic conditions including growing degree days, length of growing season, rainfall and snowfall;
   compiling a schedule for controlled defoliation by said ruminant grazing animals on said tract;
   releasing said ruminant grazing animals in accord with the controlled defoliation schedule in the tract of land;
   removing the ruminant grazing animals from the tract of land in accord with the schedule;
   measuring changes in animal condition which occurred during the schedule;
   measuring changes in plant condition which occurred during the schedule;
   converting changes in animal condition to amounts of forage consumed from the specific tract of land;
   further converting amounts of forage consumed by the ruminant grazing animals from the tract of land to amounts of carbon; and
   obtaining from a governmental authority certification for a carbon credit based on the amounts of carbon calculated.

2. The method in accordance with claim 1 including the further step of trading the carbon credit to a purchaser.

3. A method for measuring carbon credits to be sold to a purchaser of carbon credits, the method comprising the steps of:

identifying metes, bounds and descriptions of a tract of land;
   compiling information specific to the tract comprising information on soil types, levels of fertility, inventories of forage plants, climatic conditions including growing degree days, length of growing season, rainfall and snowfall;
   compiling a schedule for controlled defoliation by mechanical means of plants on the tract;
   defoliating at least in part, plants on the tract by mechanical means;
   collecting the defoliated plant material;
   compiling carbon credits from the defoliated plant material; and
   obtaining governmental authority certification for the carbon credits based on the amounts of compiled carbon credits.

4. The method of claim 3 including the further step of trading the carbon credits to a purchaser.

5. A method in accordance with claim 3 comprising the step of according distinctive carbon dioxide sequestration values to (a) plant material root growth, humification of crop residue and humification of animal waste and (b) plant material, stems, stalks, leaves and plants other than roots.

6. A method in accordance with claim 5 comprising the controlled growth of woody or herbaceous plants.

* * * * *